United States Patent [19]
Bestenreiner et al.

[11] Patent Number: 4,605,954
[45] Date of Patent: Aug. 12, 1986

[54] METHOD OF AND ARRANGEMENT FOR ADJUSTING COLOR SATURATION IN A VIDEO PRINTER

[75] Inventors: Friedrich Bestenreiner, Gruenwald; Immo Boie, Langenfeld; Josef Helmberger, Munich, all of Fed. Rep. of Germany

[73] Assignee: Agfa-Gevaert Aktiengesellschaft, Leverkusen, Fed. Rep. of Germany

[21] Appl. No.: 605,494

[22] Filed: Apr. 30, 1984

[30] Foreign Application Priority Data

Apr. 29, 1983 [DE] Fed. Rep. of Germany ....... 3315616

[51] Int. Cl.$^4$ .............................................. H04N 9/68
[52] U.S. Cl. ......................................... 358/27; 358/80
[58] Field of Search .................... 358/27, 75, 80, 332, 358/333, 334

[56] References Cited

U.S. PATENT DOCUMENTS 4,418,358  11/1983  Poetsch ................................. 358/80
4,556,900  12/1985  Willis ..................................... 358/27

Primary Examiner—Michael A. Masinick
Attorney, Agent, or Firm—Peter K. Kontler

[57] ABSTRACT

An image to be printed in a CRT or video color printer is sensed to generate red, blue and green signals respectively representing a characteristic of the image in red, blue and green. The signals are processed in a matrix circuit to generate a luminance signal. The red and blue signals are subtracted from the luminance signal in operational amplifiers to obtain unadjusted difference signals. Each of the unadjusted difference signals is multiplied by an adjusting factor which is established using variable resistors and functions to provide level adjustment. The adjusted difference signals obtained in this manner are subtracted from the luminnce signal in respective operational amplifiers to yield modified red and blue signals. The modified red and blue signals are processed together with the luminanace signal in a second matrix circuit to generate a modified green signal. Control of color saturation may be achieved simply and inexpensively by adjusting the variable resistors and thereby changing the adjusting factor which determines color saturation.

22 Claims, 1 Drawing Figure

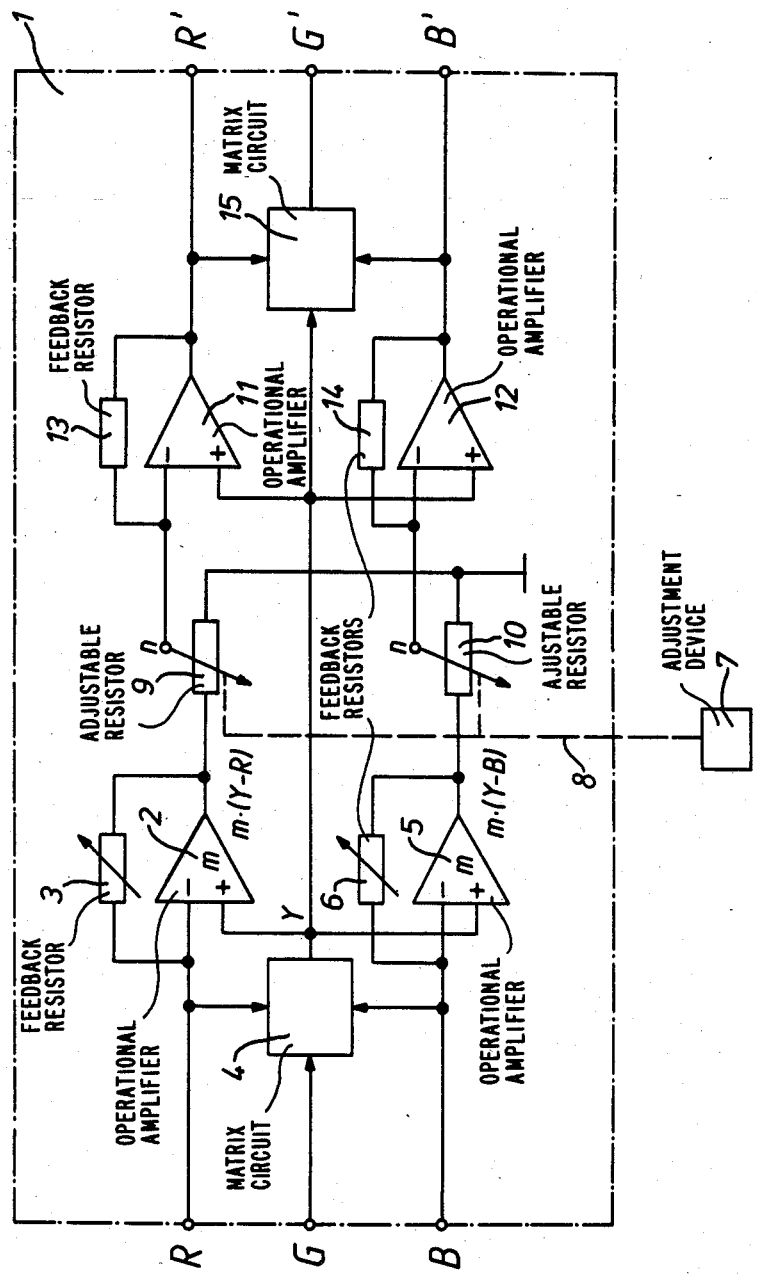

METHOD OF AND ARRANGEMENT FOR ADJUSTING COLOR SATURATION IN A VIDEO PRINTER

BACKGROUND OF THE INVENTION

The invention relates generally to a color printer.

More particularly, the invention relates to a method of and an arrangement for adjusting color saturation in a color printer, especially a video printer.

During the making of a print in a color video printer or CRT printer, i.e. cathode ray tube printer, instant print color paper is consecutively exposed to radiation in the three primary colors. When standard video signals are used and the exposures in the primary colors are regulated in such a manner that the peak white light intensity does not result in overexposure, areas in which maximum saturation of the primary colors red, green, blue and the complementary colors yellow, magenta, cyan exists are darkened upon reproduction. The brightness found in conventional prints is not achieved.

Investigations of this problem have revealed that an image may be reproduced on instant print color paper without significant darkening if the individual exposures in the primary colors can be performed with red, green and blue light of high illuminating color and purity. However, when a television test image is printed on instant print color paper and such image contains, in addition to the primary colors red, green, blue and the complementary colors yellow, magenta, cyan, a white area with maximum dominant amplitude, i.e. an area of peak white intensity, the exposure is determined by the white signal. If overexposure of the white area is avoided by appropriate selection of the amplitude of the white signal, insufficient exposure of areas saturated in the primary and complementary colors is obtained and these colors are darkened upon reproduction. Consequently, the brightness of the print is substantially less than that of conventional prints.

OBJECTS AND SUMMARY OF THE INVENTION

It is an object of the invention to provide a method which makes it possible to increase the brightness of prints derived from images having areas of peak white intensity.

Another object of the invention is to provide a relatively simple method of generating a control signal which enables highly saturated colors and increased illumination to be obtained in a color printer, especially a CRT printer.

An additional object of the invention is to provide a relatively inexpensive method of generating a control signal which enables highly saturated colors and increased illumination to be obtained in a color printer, especially a CRT printer.

A further object of the invention is to provide a method which makes it possible to adjust color saturation in a color printer relatively simply and inexpensively without greatly changing the exposure in the region of the white point.

It is also an object of the invention to provide an arrangement which makes it possible to increase the brightness of a print derived from an image having an area of peak white intensity.

Yet another object of the invention is to provide a relatively simple arrangement for generating a control signal which enables highly saturated colors and increased illumination to be obtained in a color printer, especially a CRT printer.

Still a further object of the invention is to provide a relatively inexpensive arrangement for generating a control signal which enables highly saturated colors and increased illumination to be obtained in a color printer, especially a CRT printer.

An additional object of the invention is to provide an arrangement which makes it possible to adjust color saturation in a color printer relatively simply and inexpensively without greatly changing the exposure in the region of the white point.

The preceding objects, as well as others which will become apparent as the description proceeds, are achieved by the invention.

One aspect of the invention resides in a method of adjusting color saturation in a color printer, particularly a CRT or video color printer. The method comprises the following steps:

(a) Generating a luminance signal Y for an image to be printed by processing a first blue signal B representing a characteristic of the image in blue together with a first red signal R and a first green signal G respectively representing the characteristic in red and green.

(b) Forming a pair of unadjusted difference signals, e.g. $Y-R$ and $Y-B$, by subtraction of the luminance signal Y and two selected ones, e.g. R and B, of the first signals R, B, G.

(c) Adjusting each of the unadjusted difference signals to obtain a pair of adjusted difference signals.

(d) Deriving a pair of modified signals, e.g. R' and B', for the two colors, e.g. red and blue, corresponding to the selected first signals by subtraction of the luminance signal Y and the adjusted difference signals.

(e) Calculating a modified signal, e.g. G', for the third color, e.g. green, by combining the luminance signal Y with the pair of modified signals obtained from the deriving step.

The adjusting step may involve multiplying each of the unadjusted difference signals by an adjusting factor. Preferably, the two unadjusted difference signals are multiplied by a common adjusting factor.

The generating step may be performed in a matrix circuit as may the calculating step.

Another aspect of the invention resides in an arrangement for adjusting color saturation in a color printer, particularly a CRT or video color printer. The arrangement comprises the following:

(a) Conductor means for the transmission of a first blue signal B representing a characteristic of an image to be printed in blue, a first red signal R representing the characteristic in red and a first green signal G representing the characteristic in green. It is preferred for the conductor means to include a set of three conductors, one for each of the first signals.

(b) First calculating means arranged to receive the first signals B, R, G and to generate a luminance signal Y therefrom. The first calculating means may, for instance, comprise a matrix circuit.

(c) Subtracting and adjusting means arranged to receive the luminance signal Y and two selected ones, e.g. R and B, of the first signals R, B, G. The subtracting and adjusting means is designed to form a pair of unadjusted difference signals, e.g. $Y-R$ and $Y-B$, by subtraction of the luminance signal Y and the selected first signals, e.g. R and B. The subtracting and adjusting means is also designed to adjust each of the unadjusted difference signals so as to generate a pair of adjusted difference signals. In a preferred embodiment of the invention, the subtracting and adjusting means is designed to multiply each of the unadjusted difference signals by an adjusting factor. Advantageously, the subtracting and adjusting means is designed to multiply the two unadjusted difference signals by a common adjusting factor.

(d) Subtracting means arranged to receive the luminance signal Y and the adjusted difference signals. The subtracting means is designed to generate a pair of modified signals, e.g. R' and B', for the two colors, e.g. red and blue, corresponding to the selected first signals, e.g. R and B, by subtraction of the luminance signal Y and the adjusted difference signals.

(e) Second calculating means arranged to receive the luminance signal Y and the modified signals for the two colors corresponding to the selected first signals. The second calculating means is designed to derive a modified signal, e.g. G', for the third color, e.g. green, from the luminance signal Y and the modified signals generated by the subtracting means. The second calculating means may, for example, comprise a matrix circuit.

The subtracting and adjusting means advantageously includes adjustable resistor means for varying the adjusting factor.

According to one embodiment of the invention, the subtracting and adjusting means further includes operational amplifier means. The resistor means may then comprise at least one resistor which functions as a feedback resistor for the operational amplifier means. Such resistor may operate to cause signal amplification.

According to another embodiment of the invention, the subtracting and adjusting means includes voltage divider means. Here, the resistor means may include at least one resistor which constitutes part of the voltage divider means.

In accordance with a further embodiment of the invention, the subtracting and adjusting means may include operational amplifier means as well as voltage divider means. The resistor means may then include one or more resistors which function as feedback resistors for the operational amplifier means and/or constitute part of the voltage divider means.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE illustrates an arrangement according to the invention for adjusting color saturation in a CRT printer.

DESCRIPTION OF THE PREFERRED EMBODIMENTS

In the method of the invention, an image to be printed in a CRT or video color printer is sensed in a conventional manner to measure a characteristic thereof in each of the three primary colors red, green and blue. For instance, the density or transparency of the image in each of the three primary colors may be determined. A blue signal B representing the characteristic of the image in blue is generated as are a red signal R representing the characteristic in red and a green signal G representing the characteristic in green.

In the color television PAL technique, i.e. phase alternation line technique, the video signal from the image is divided into a luminance signal Y and a chrominance signal. The luminance signal Y is defined by the following equation:

$$Y = 0.30 \times R + 0.59 \times G + 0.11 \times B \quad (1)$$

The luminance signal Y may be calculated in a matrix circuit which receives the red, green and blue signals R, G, B.

The chrominance signal is represented by a vector A the magnitude of which denotes the color saturation. The magnitude of the vector A is equal to the square root of $U^2$ plus $V^2$ where:

$$U = k_u \cdot (B - Y), \quad k_u = 0.493 \quad (2a)$$

$$V = k_v \cdot (R - Y), \quad k_v = 0.877 \quad (2b)$$

The angle alpha defined by the vector A characterizes the color tone and is obtained from the following equation:

$$\tan \text{ alpha} = V/U \quad (2c)$$

In accordance with the method of the invention, a pair of unadjusted difference signals is formed once the luminance signal Y has been calculated. The unadjusted difference signals are derived by subtraction of the luminance signal Y and two of the color signals R, G, B. Assuming the two color signals to be R and B, the unadjusted difference signals may be written as follows:
Y−R and
Y−B.

Each of the unadjusted difference signals is now adjusted to obtain a pair of adjusted difference signals. Adjustment may be achieved by multiplying each of the unadjusted difference signals by an adjusting factor. Preferably, a common adjusting factor 1/k is used for the two unadjusted difference signals. The adjusted difference signals obtained upon multiplication of the unadjusted difference signals by the adjusting factor 1/k may be written as follows:

$$\frac{Y-R}{k} \text{ and } \frac{Y-B}{k}.$$

A modified red signal R' and a modified blue signal B' may now be derived by subtraction of the luminance signal and the adjusted difference signals. The modified red and blue signals R' and B' may be represented by the following equations:

$$R' = Y - \frac{Y-R}{k} = (1 - 1/k) \cdot Y - R/k \quad (3a)$$

$$B' = Y - \frac{Y-B}{k} = (1 - 1/k) \cdot Y - B/k \quad (3b)$$

A modified green signal G' is calculated from the luminance signal Y, the modified red signal R' and the modified blue signal B'. Similarly to calculation of the luminance signal Y, the calculation of the modified green signal G' is preferably performed in a matrix circuit. The modified green signal G' calculated from the luminance signal Y, the modified red signal R' and the modified blue signal B'0 may be represented by the following equation:

$$G' = Y - \frac{Y-G}{K} = (1 - 1/k) \cdot Y - G/k \qquad (3c)$$

Thus, in accordance with the invention, modified red, blue and green signals R', B', G' are derived from the basic red, blue and green signals R, B, G.

The factor k is a level adjustment factor and is advantageously greater than 0 but less than 1. The common part of the modified color signals R', B', G', i.e. the part of the modified color signals R', B', G' represented by the term $(1-1/k) \cdot Y$, is then reduced. On the other hand, that part of each modified color signal R', B', G' specific to the particular color is increased. This results in increased saturation for chromatic colors.

The color saturation for the different colors may be adjusted simultaneously by means of an adjusting member such as a handle or dial which is common to the different color channels. In other words, the operation of adjusting the unadjusted difference signals may be carried out in such a manner that the two unadjusted difference signals are adjusted simultaneously. The use of a common adjusting member is of advantage when the saturation is always to be changed to the same extent, that is, when the value of k is the same or constant.

Should it be necessary to adjust the saturation differently for different images, the separation of the color signals into luminance and chrominance signals with subsequent adjustment of the chrominance signals in accordance with the invention, i.e. with subsequent changes in the vector A representing the chrominance signal, permits this to be accomplished in an advantageous and simple manner. Contrary to conventional television technique, the transformations of the individual color signals take place over the full video bandwidth. An auxiliary color carrier is not required.

The matrix values for the matrix circuits employed in deriving the luminance signal Y and the modified green signal G' may, for any selected change in saturation, be calculated from the input values of the red, blue and green signals R, B, G. This may be accomplished by means of an appropriate computer module or chip. The matrix values may then be transferred to the respective matrix circuits via appropriate control elements.

It is also possible to calculate the matrix values using a coder/decoder chain operating in parallel. The matrix values may here be transferred to the respective matrix circuits by means of automatic control elements. The coder/decoder chain may operate as an analog computer.

The level adjustment in accordance with the invention is advantageously accomplished using adjustable resistors, that is, the value of k is advantageously set by means of adjustable resistors. An adjustable resistor used for this purpose may constitute part of an operational amplifier and/or a voltage divider.

Referring now to the FIGURE, the reference numeral 1 generally identifies a transducer circuit or arrangement which may be used to carry out the method of the invention. The transducer circuit 1 has three input terminals. The red, green and blue signals R, G, B from an image to be printed each enter the transducer circuit 1 via a respective input terminal. The transducer circuit 1 further has three output terminals which emit the modified red, green and blue signals R', G', B'. The input terminal for the red signal R is connected with the output terminal for the modified red signal R' by a first channel while the input terminal for the blue signal B is connected with the output terminal for the modified blue signal B' by a second channel. A third channel connects the input terminal for the green signal G with the output terminal for the modified green signal G'.

A conductor connects the input terminal for the red signal R with the inverting input of an operational amplifier 2. The operational amplifier 2 has a feedback resistor 3. Similarly, a conductor extends from the input terminal for the blue signal B to the inverting input of a second operational amplifier 5. The operational amplifier 5 has a feedback resistor 6.

The input terminals for the red and blue signals R, B are further connected with respective inputs of a first matrix circuit 4. The matrix circuit 4 has a further input which is connected with the input terminal for the green signal G by means of a conductor. In the matrix circuit 4, the red, green and blue signals R, G, B are processed to generate the luminance signal Y. The output of the matrix circuit 4 is connected with the non-inverting input of the operational amplifier 2 as well as the non-inverting input of the operational amplifier 5. The matrix circuit 4 may be referred to as a first calculating means.

The operational amplifier 2 subtracts the red signal R from the luminance signal Y to generate the unadjusted difference signal $Y-R$. The operational amplifier 2 has an amplification factor m and the unadjusted difference signal $Y-R$ is amplified by this amplification factor m. Accordingly, a signal $m(Y-R)$ is emitted by the operational amplifier 2.

Similarly, the operational amplifier 5 subtracts the blue signal B from the luminance signal Y to generate the unadjusted difference signal $Y-B$. In the illustrated embodiment, the operational amplifier 5 has the same amplification factor m as the operational amplifier 2. The operational amplifier 5 amplifies the unadjusted difference signal $Y-B$ by the amplification factor m and emits a signal $m(Y-B)$.

The output of the operational amplifier 2 is connected with an adjustable resistor 9 while the output of the operational amplifier 5 is connected with a second adjustable resistor 10. The adjustable resistors 9 and 10 are connected by a mechanical link 8 so that they may be adjusted simultaneously by means of a common adjusting element or dial 7. The adjustable resistors 9 and 10 have a division ratio n which is greater than or equal to 1. The division ratio n, and hence the color saturation, may be varied by means of the adjusting element 7.

The output signal $m(Y-R)$ of the operational amplifier 2 is attenuated in the adjustable resistor 9. Likewise, the output signal $m(Y-B)$ of the operational amplifier 5 is attenuated in the adjustable resistor 10. The amplification factor m and the division ratio n together define a quotient m/n by which the unadjusted difference signals $Y-R$ and $Y-B$ are multiplied. The quotient m/n is the adjusting factor 1/k.

Multiplication of the unadjusted difference signal $Y-R$ by the quotient m/n yields the adjusted difference signal $(Y-R) \times m/n$. Similarly, multiplication of the unadjusted difference signal $Y-B$ by the quotient m/n yields the adjusted difference signal $(Y-B) \times m/n$.

The operational amplifiers 2, 5, feedback resistors 3, 6 and adjustable resistors 9, 10 together constitute subtracting and adjusting means.

The tap of the adjustable resistor 9 is connected with the inverting input of an operational amplifier 11 whereas the tap of the adjustable resistor 10 is connected with the inverting input of another operational amplifier 12. The non-inverting inputs of the operational amplifiers 11, 12 are connected with the output of the matrix circuit 4 and thus receive the luminance signal Y. The operational amplifier 11 has a feedback resistor 13 while the operational amplifier 12 has a feedback resistor 14.

The operational amplifier 11 subtracts the adjusted red difference signal $(Y-R) \times m/n$ from the luminance signal Y to generate the modified red signal $R' = Y - (Y-R) \times m/n$. Likewise, the operational amplifier 12 subtracts the adjusted blue difference signal $(Y-B) \times m/n$ from the luminance signal Y to generate the modified blue signal $B' = Y - (Y-B) \times m/n$.

The operational amplifiers 11, 12 may be referred to as subtracting means.

The modified red signal R' emitted by the operational amplifier 11 and the modified blue signal B' emitted by the operational amplifier 12 are delivered to respective inputs of a second matrix circuit or second calculating means 15. The second matrix circuit 15 has a further input which is connected with the output of the first matrix circuit 4 and accordingly receives the luminance signal Y. In the matrix circuit 15, the luminance signal Y, the modified red signal R' and the modified blue signal B' are processed to generate the modified green signal $G' = Y - (Y-G) \times m/n$.

In accordance with the invention, color saturation may be adjusted as desired in a simple and inexpensive manner by changing both the amplification factor m and the division ratio n or by changing only the division ratio n.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of adjusting color saturation in a color printer, particularly a video printer, comprising the steps of:
   (a) generating a luminance signal for an image to be printed by processing a first blue signal representing a characteristic of the image in blue together with a first red signal and a first green signal respectively representing the characteristic in red and green;
   (b) forming a pair of unadjusted difference signals by subtraction of said luminance signal and two selected ones of said first signals;
   (c) adjusting each of said unadjusted difference signals to obtain a pair of adjusted difference signals;
   (d) deriving a pair of modified signals for the two colors corresponding to said selected signals by subtraction of said luminance signal and said adjusted difference signals; and
   (e) calculating a modified signal for the third color by combining said luminance signal with said pair of modified signals.

2. The method of claim 1, wherein said third color is green.

3. The method of claim 1, wherein the generating step is performed by a matrix circuit.

4. The method of claim 1, wherein the calculating step is performed by a matrix circuit.

5. The method of claim 1, wherein the adjusting step comprises multiplying each of said unadjusted difference signals by an adjusting factor.

6. The method of claim 5, wherein both of said unadjusted difference signals are multiplied by the same adjusting factor.

7. The method of claim 5, wherein the adjusting factor for both of said unadjusted difference signals is 1/k where k is greater than 0 and less than 1.

8. An arrangement for adjusting color saturation in a color printer, particularly a video printer, comprising:
   (a) conductor means for the transmission of a first blue signal representing a characteristic of an image to be printed in blue, a first red signal representing the characteristic in red and a first green signal representing the characteristic in green;
   (b) first calculating means arranged to receive the first signals and to generate a luminance signal therefrom;
   (c) subtracting and adjusting means arranged to receive the luminance signal and two selected ones of the first signals, said subtracting and adjusting means being designed to form a pair of unadjusted difference signals by subtraction of the luminance signal and the selected first signals, and said subtracting and adjusting means also being designed to adjust each of the unadjusted difference signals so as to generate a pair of adjusted difference signals;
   (d) subtracting means arranged to receive the luminance signal and the adjusted difference signals, said subtracting means being designed to generate a pair of modified signals for the two colors corresponding to the selected first signals by subtraction of the luminance signal and the adjusted difference signals; and
   (e) second calculating means arranged to receive the luminance signal and the modified signals for the two colors corresponding to the selected first signals, said second calculating means being designed to derive a modified signal for the third color from the luminance signal and the modified signals generated by said subtracting means.

9. The arrangement of claim 8, wherein said subtracting and adjusting means is arranged to receive the first blue and first red signals.

10. The arrangement of claim 8, wherein said first calculating means comprises a matrix circuit.

11. The arrangement of claim 8, wherein said second calculating means comprises a matrix circuit.

12. The arrangement of claim 8, wherein said subtracting and adjusting means is designed to multiply each of the unadjusted difference signals by an adjusting factor.

13. The arrangement of claim 12, wherein said subtracting and adjusting means is designed to multiply each of the unadjusted difference signals by the same adjusting factor.

14. The arrangement of claim 12, wherein said subtracting and adjusting means is designed to multiply each of the unadjusted difference signals by an adjusting factor 1/k where k is greater than 0 and less than 1.

15. The arrangement of claim 12, wherein said subtracting and adjusting means comprises operational amplifier means.

16. The arrangement of claim 15, wherein said subtracting and adjusting means comprises adjustable resistor means for varying the adjusting factor, said resistor means including at least one feedback resistor for said operational amplifier means.

17. The arrangement of claim 16, wherein said subtracting and adjusting means comprises voltage divider means, said resistor means including at least one resistor which constitutes part of said voltage divider means.

18. The arrangement of claim 12, wherein said subtracting and adjusting means comprises voltage divider means.

19. The arrangement of claim 18, wherein said subtracting and adjusting means comprises adjustable resistor means for varying the adjusting factor, said resistor means including at least one resistor which constitutes part of said voltage divider means.

20. The arrangement of claim 12, wherein said subtracting and adjusting means comprises adjustable resistor means for varying the adjusting factor.

21. The arrangement of claim 12, comprising a pair of signal-transmitting channels for the two colors corresponding to the selected first signals, each of said channels comprising a conductor constituting part of said conductor means, a subtracting and adjusting unit constituting part of said subtracting and adjusting means, and a subtracting unit constituting part of said subtracting means.

22. The arrangement of claim 21, wherein each of said subtracting and adjusting units comprises an adjustable resistor for varying the adjusting factor; and further comprising a common adjusting device for said resistors.

* * * * *